US011501465B2

(12) United States Patent
Koblin

(10) Patent No.: US 11,501,465 B2
(45) Date of Patent: Nov. 15, 2022

(54) TIME-LAPSE STEREO MACRO PHOTOGRAPHY SYSTEMS AND METHODS AND STEREO TIME-LAPSE VIDEO MADE WITH SAME

(71) Applicant: WITHIN UNLIMITED, INC., Los Angeles, CA (US)

(72) Inventor: Aaron Koblin, Venice, CA (US)

(73) Assignee: WITHIN UNLIMITED, INC., Venice, CA (US)

( * ) Notice: Subject to any disclaimer, the term of this patent is extended or adjusted under 35 U.S.C. 154(b) by 0 days.

(21) Appl. No.: 17/050,450

(22) PCT Filed: May 3, 2019

(86) PCT No.: PCT/IB2019/053619
§ 371 (c)(1),
(2) Date: Oct. 25, 2020

(87) PCT Pub. No.: WO2019/215554
PCT Pub. Date: Nov. 14, 2019

(65) Prior Publication Data
US 2021/0241493 A1     Aug. 5, 2021

Related U.S. Application Data

(60) Provisional application No. 62/667,730, filed on May 7, 2018.

(51) Int. Cl.
*G06T 7/80* (2017.01)
*G06T 7/38* (2017.01)
(Continued)

(52) U.S. Cl.
CPC ............... *G06T 7/85* (2017.01); *G03B 35/02* (2013.01); *G06T 7/285* (2017.01); *G06T 7/38* (2017.01);
(Continued)

(58) Field of Classification Search
CPC .. G06T 7/85; G06T 7/285; G06T 7/38; G06T 7/596; G06T 2207/10021; G06T 17/00; G03B 35/02
See application file for complete search history.

(56) References Cited

U.S. PATENT DOCUMENTS

2004/0201756 A1* 10/2004 VanBree ............ H04N 5/23299
348/E5.022
2011/0050960 A1   3/2011 Niemi et al.
(Continued)

OTHER PUBLICATIONS

WIPO, International Search Report received in International Application No. PCT/IB2019/053619, dated Sep. 13, 2019, (3p.).
(Continued)

*Primary Examiner* — Chan S Park
*Assistant Examiner* — Daniel C Chang
(74) *Attorney, Agent, or Firm* — Siritzky Law, PLLC

(57) ABSTRACT

Systems and methods for macro stereo time-lapse photography, producing a stereographic time-lapse digital video, and macro stereographic time-lapse digital videos. A method of producing a sequence of time-lapse stereographic images of a subject, by positioning a camera with a macro lens at a first position relative to the subject; using the camera to obtain a first stack of images of the subject from the first position; positioning the camera at a second position relative to the subject; using the camera to obtain a second stack of images of the subject from the second position; and storing the first stack of images and the second stack of images as a stack pair; and then selectively repeating.

19 Claims, 5 Drawing Sheets

(51) Int. Cl.
  *G06T 7/593* (2017.01)
  *G06T 7/285* (2017.01)
  *G03B 35/02* (2021.01)
(52) U.S. Cl.
  CPC .... *G06T 7/596* (2017.01); *G06T 2207/10021* (2013.01)

(56) References Cited

U.S. PATENT DOCUMENTS

| | | | | |
|---|---|---|---|---|
| 2012/0113233 | A1* | 5/2012 | Yamaguchi | G02B 30/54 |
| | | | | 359/463 |
| 2013/0342655 | A1* | 12/2013 | Gutierrez | G03B 35/02 |
| | | | | 348/46 |
| 2015/0281675 | A1 | 10/2015 | Riederer | |
| 2015/0377999 | A1* | 12/2015 | Shen | G01S 3/7864 |
| | | | | 348/144 |
| 2016/0127641 | A1 | 5/2016 | Gove | |
| 2017/0224212 | A1 | 8/2017 | Cornsweet et al. | |
| 2017/0374259 | A1 | 12/2017 | Nakamura | |
| 2020/0014848 | A1* | 1/2020 | Gove | G06F 3/01 |

OTHER PUBLICATIONS

WIPO, International Written Opinion received in International Application No. PCT/IB2019/053619, dated Sep. 13, 2019, (9p.).

\* cited by examiner

STACK PAIRS

| Time | Left Stack | Right Stack |
|---|---|---|
| T1 | LS1 | RS1 |
| T2 | LS2 | RS2 |
| ⋮ | ⋮ | ⋮ |
| Tk | LSk | RSk |

FIG. 5A

IMAGE PAIRS

| Time | Left Image | Right Image |
|---|---|---|
| T1 | LI1 | RI1 |
| T2 | LI2 | RI2 |
| ⋮ | ⋮ | ⋮ |
| Tk | LIk | RIk |

FIG. 5B

TIME-LAPSE STEREO MACRO PHOTOGRAPHY SYSTEMS AND METHODS AND STEREO TIME-LAPSE VIDEO MADE WITH SAME

RELATED APPLICATIONS

This application is a 371 of International application PCT/IB2019/053619, filed May 3, 2019, the entire contents of which are hereby fully incorporated herein by reference for all purposes. PCT/IB2019/053619 claims the benefit of U.S. Provisional patent application No. 62/667,730 filed May 7, 2018, the entire contents of which are hereby fully incorporated herein by reference for all purposes.

COPYRIGHT STATEMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to macro and micro photography. More particularly, this invention relates to time-lapse stereo macro and micro photography.

SUMMARY

The present invention is specified in the claims as well as in the below description. Preferred embodiments are particularly specified in the dependent claims and the description of various embodiments.

Below is a list of method or process embodiments. Those will be indicated with a letter "M". Whenever such embodiments are referred to, this will be done by referring to "M" embodiments.

M1. A method of producing a sequence of time-lapse stereographic images of a subject, the method comprising:
(A) positioning a camera with a macro lens at a first position relative to the subject;
(B) using the camera to obtain a first stack of images of the subject from the first position;
(C) positioning the camera at a second position relative to the subject;
(D) using the camera to obtain a second stack of images of the subject from the second position;
(E) storing the first stack of images and the second stack of images as a stack pair; and
(F) selectively repeating acts (A)-(E).

M2. The method of embodiment M1, wherein said selectively repeating in (F) is based on a period of total elapsed time and/or a number of stack pairs obtained.

M3. The method of embodiments M1 or M2, wherein said first position is to the left of the second position.

M4. The method of any one of the preceding embodiments, wherein the focus of the lens is the same at the first position and the second position.

M5. The method of any one of the preceding embodiments, wherein the camera is located in a three-dimensional space relative to the subject, and wherein said positioning in (A) and (C) changes the camera's position for only one of the dimensions.

M6. The method of any one of the preceding embodiments, wherein each repetition of acts (A)-(E) forms a corresponding stack pair, the method further comprising: forming a series of image pairs from the stack pairs.

M7. The method of any one of the preceding embodiments, further comprising: (A2) waiting a predetermined amount of time after position the camera in (A) and before using the camera in (B).

M8. The method of any one of the preceding embodiments, wherein the acts (A)-(F) are, at least in part, controlled by a controller.

M9. The method of embodiment M8, wherein the controller is independent of the camera.

M10. The method of any one of the preceding embodiments, wherein one or more of the following are parameterized:
(i) the first position;
(ii) the second position;
(iii) the number of images in the first stack;
(iv) the number of images in the second stack;
(v) the number of times acts (A)-(E) are repeated;
(vi) the time period during which acts (A)-(F) are repeated;
(vii) the number of stack pairs obtained;
(viii) the total elapsed time.

M11. The method of any one of the preceding embodiments, wherein the second position is determined as a function of the first position and a distance of the camera to the subject.

M12. The method of any one of the preceding embodiments, wherein said using the camera in (B) occurs a first preset time after said positioning in (A).

M13. The method of embodiment M12, wherein said first preset time is selected to avoid vibration based on said positioning in (A).

M14. The method of any one of the preceding embodiments, wherein said using the camera in (D) occurs a second preset time after said positioning in (C).

M15. The method of embodiment M14, wherein said second preset time is selected to avoid vibration based on said positioning in (C).

M16. The method of any one of the preceding embodiments, wherein the camera moves along a line, the method further comprising: (A1) rotating the camera by a particular angle (R) with respect to the line prior to using the camera in (B).

M17. The method of embodiment M16, wherein said rotating in (A1) occurs during said positioning in (A).

M18. The method of embodiments M16 or M17, further comprising, (C1) rotating the camera by a negative of the particular angle (-R) with respect to the line prior to using the camera in (D).

M19. The method of embodiment M18, wherein said rotating in (C1) occurs during said positioning in (C).

M20. The method of any one of the preceding embodiments, wherein a distance between said first position and said second position, referred to as a stereo base, is based on one or more of: a parallax desired; a largest distance of the subject from the camera lens, the nearest distance of the subject from the camera lens, and the focal length of the lens.

M21. The method of any one of the preceding embodiments, wherein a distance between said first position and said second position, referred to as a stereo base, is determined automatically by said controller based on information obtained from said camera and/or information provided by a user.

M22. The method of any one of embodiments M16-M21, wherein said particular angle R is determined automatically, based on one or more of: a distance between the first position and the second position; and a distance of the camera from a part of the subject.

Below is a list of sequence or video embodiments. Those will be indicated with a letter "S" or "F". Whenever such embodiments are referred to, this will be done by referring to "S" or "F" embodiments.

S23. A sequence of image pairs obtained by the method of any one of the preceding embodiments.

S24. The sequence of embodiment S23, wherein said sequence comprises a stereo time-lapse video.

S25. The sequence of embodiment S24, wherein said video comprises a digital video.

F26. A stereo time-lapse video comprising multiple image pairs obtained by the method of any one of the preceding method embodiments.

F27. The stereo time-lapse video of embodiment F26, wherein said video comprises a digital video.

A skilled reader will understand, that any method described above or below and/or claimed and described as a sequence of steps is not restrictive in the sense of the order of steps.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIGS. 5A-5B are data structures according to exemplary embodiments hereof.

DETAILED DESCRIPTION OF THE PRESENTLY PREFERRED EXEMPLARY EMBODIMENTS

Discussion

Figure 1:
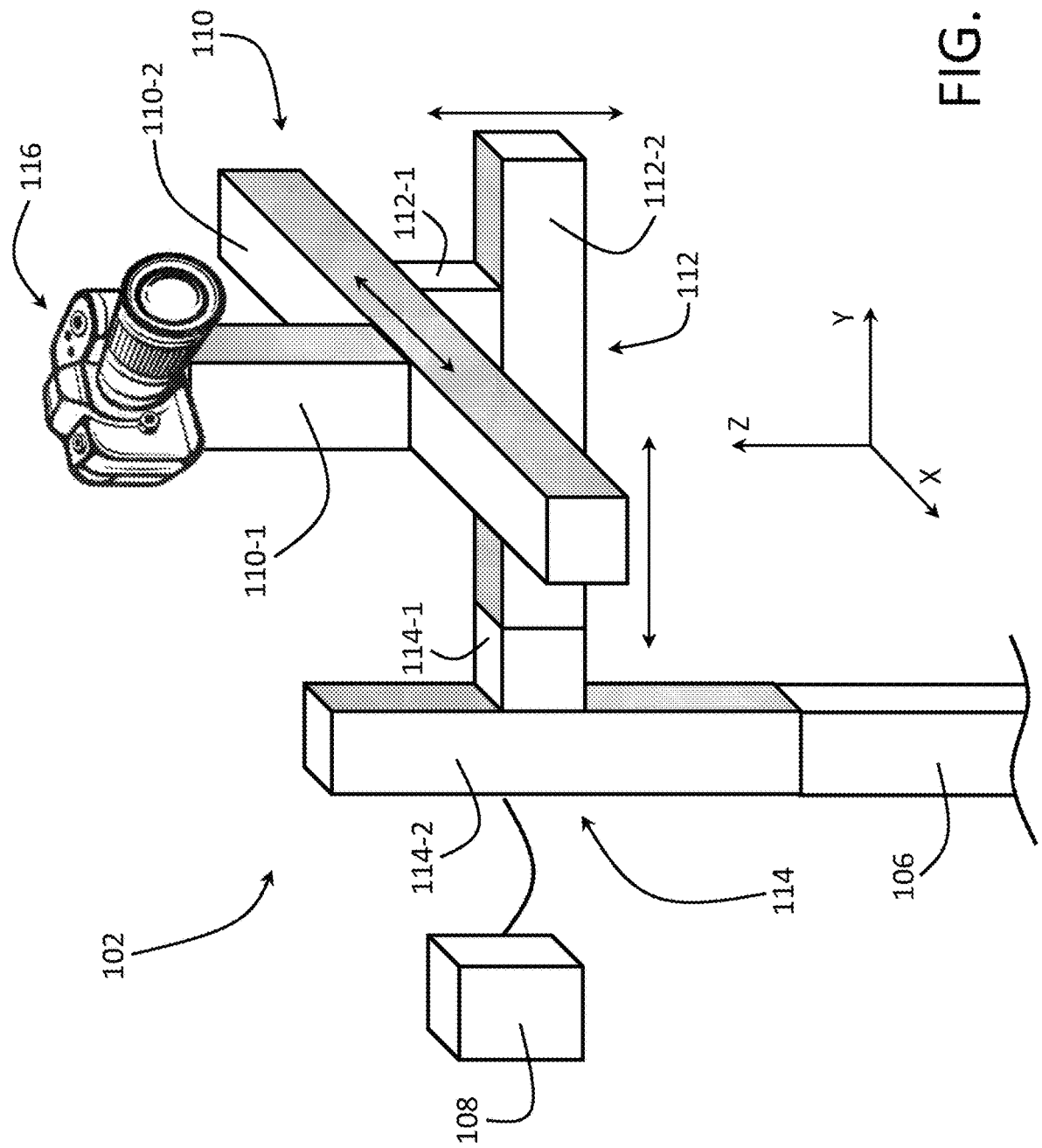
FIGS. 1, 2, 3A and 3B show aspects of a time-lapse stereo macro photography system according to exemplary embodiments hereof.

The inventor has realized that conventional time lapse and stereographic techniques do not apply to macro photography, in particular due to the small dimensions at play. For example, when taking a macro photograph, the subject of the photograph may typically be required to be very close to the lens of the camera due to its extremely small size. For example, a macro lens with a 50 mm focal length may require for the lens to be within ~22.86 cm (~9.0 inches) of the subject to be in focus.

This disclosure presents devices and techniques for achieving time-lapse stereographic macro and micro photography.

Description

A system according to exemplary embodiments hereof will be described in detail and with reference to the drawing in FIG. 1. The system 100 may include an assembly that may include a positioning assembly 102, a camera mount (not shown), a support structure 106 and a controller 108. In general, a camera 116 (e.g., a camera equipped with a macro lens) may be mounted on the positioning assembly 102, and the positioning assembly may position the camera 116 at any coordinate or location in three-dimensional space (with respect to the assembly 100) as required.

The camera mount may be a conventional mount and may include an upward extending bolt that may be received into the standard threaded mounting hole found on the underside of most conventional cameras. In this way, the camera 116 may be securely attached to the mount and to the positioning assembly 102. Note that other attachment mechanisms may also be used to attach the camera 116 to the mount such as clamps, latches, brackets and other types of attachment mechanisms.

The assembly 100 and the camera 116 may be supported by the support structure 106 (e.g., a tripod, a stand, a column, a pole structure, a clamp, a bracket or other type of support structure). In this way, the camera 116 and the assembly 100 may be adequately supported during use while taking photographs.

According to exemplary embodiments hereof, the positioning assembly 102 may include an X-axis positioning mechanism 110, a Y-axis positioning mechanism 112, and a Z-axis positioning mechanism 114. The positioning mechanisms 110, 112, 114 preferably operate independent of each other and may position the mount 102 and attached camera 116 in any three-dimensional position with respect to the assembly 100, as required.

The movement resolution of the positioning assembly 102 is preferably sufficiently fine to allow the camera 116 to be moved in very small, very well controlled, consistent, and repeatable incremental movements. The movements should preferably be free of hysteresis. For example, preferably the positioning assembly has sufficient resolution to move the camera 116 in repeatable and consistent increments of 0.01 mm with a repeatability of 0.001 mm along each of the three axes. The accuracy of movement and positioning of the assembly 102 may be, but need not be, the same along each of the three axes. In some embodiments the accuracy of the vertical axis (the Z axis in the drawing) may be less than the accuracy of the other two axes.

In exemplary embodiments hereof, the x-axis positioning mechanism 110, the y-axis positioning mechanism 112 and the z-axis positioning mechanism 114 may each include carriages and rails. As shown in FIG. 1, the x-axis positioning mechanism 110 may include a carriage 110-1 configured with a rail 110-2 such that the carriage 110-1 may travel longitudinally along the rail 110-2 in the x-direction. Similarly, the y-axis positioning mechanism 112 and the z-axis positioning mechanism 114 may each include carriages 112-1, 114-1, respectively, that may travel longitudinally along rails 112-2, 114-2 in the y-direction and z-direction respectively.

As shown in FIG. 1, the camera 116 may be configured with the carriage 110-1 so that the camera 116 may travel in the x-direction along the rail 110-2. The rail 110-2 may be configured with the carriage 112-1 so that the rail 110-2 may travel in the y-direction along the rail 112-2. The rail 112-2 may be configured with the carriage 114-1 so that the rail 112-2 may travel in the z-direction along the rail 114-2. The rail 112-2 may be configured with the support structure 106 so that the components as described may be held stable when in use.

With this configuration, it can be seen that the camera 116 may be moved simultaneously and independently along the x-axis (e.g., by moving the carriage 110-1 along the rail 110-2), along the y-axis (e.g. by moving the carriage 112-1 along the rail 112-2) and along the z-axis (e.g., by moving the carriage 114-1 along the rail 114-2).

The carriages 110-1, 112-1, 114-1 are preferably independently motorized under control of the controller 108. The motors may position the carriages 110-1, 112-1, 114-1 along the rails 110-2, 112-2, 114-2, respectively. The motors may be electric motors or any other type of motors that may adequately move the carriages 110-1, 112-1, 114-1 with the required degrees of consistency and accuracy. Thus, preferably the motors are configured with the carriages 110-1, 112-1, and 114-1 such that the motors may move the carriages 110-1, 112-1, and 114-1 with fine resolution and in incremental movements that are repeatable, consistent, and free of hysteresis. For example, it may be preferable that the motors move the carriages 110-1, 112-1, and 114-1 in increments of 0.01 mm with a consistency and repeatability of 0.001 mm.

In some embodiments, the carriages 110-1, 112-1, 114-1 may also (or instead) be positioned manually and the assembly 102 may include micrometers and other mechanisms that may be used to manually set the position of the carriages 110-1, 112-1, 114-1 along the rails 110-2, 112-2, 114-2 respectively. Manual positioning may be used, e.g., to perform initial setup of the camera with respect to a subject.

The motors may be configured with cams and the carriages 110-1, 112-1, and 114-1 may be configured with cam followers that may each be configured with its corresponding cam. The motors may rotate the cams and the cam followers, and the corresponding carriages, may thereby move laterally along their respective axes. This may allow the motors to tightly control the movement of the carriages 110-1, 112-1, and 114-1 with sufficiently high precision. For example, the motors may have the ability to set the position of the carriages 110-1, 112-1, and 114-1 with a precision of 0.01 mm accuracy and with 0.001 mm repeatability. In this way, the system 100 may precisely control the position of the camera 116 with the precision required by focus stacking and macro stereo photography.

In some embodiments, the camera may be rotated (e.g., by automatically rotating the carriage 110-1 or a mount mechanism (not shown)). In this manner, the camera may be angled differently for the left and right images. This rotation may be referred to as a "toe-in."

As should be appreciated, the positioning assembly 102 described above is meant for demonstrational purposes, and other types of positioning assemblies 102 may also be employed that may achieve the same general functionalities as described. For example, while the positioning assembly 102 described above may be based on a Cartesian (X, Y, Z) coordinate system (e.g., comprising components that may move along planes in the X, Y and Z directions), the positioning assembly 102 may also be based on other three-dimensional coordinate systems. In one example, the positioning assembly 102 may be based on a spherical coordinate system where the position of the camera 116 may be defined by a radial distance (r) from a fixed origin, a polar angle (θ) measured from a fixed zenith direction, and an azimuth angle (φ) of its orthogonal projection on a reference plane that passes through the origin and is orthogonal to the zenith, measured from a fixed reference direction on that plane.

As described above, the camera is moved between extremes of the stereo base. In some embodiments, the camera may be at a fixed position and mirrors may be used to alternate between the left and right ends of the stereo base. For example, Lee et al. describe various examples using mirrors to obtain stereo images with a single camera. [Y.-H. Lee and T.-P. Chuang, "Finding Object Depth Using Stereoscopic Photography," in ALGORITHMS AND ARCHITECTURES FOR PARALLEL PROCESSING, PROCEEDINGS, ser. Lecture Notes in Computer Science, Hua, A and Chang, SL, Ed., vol. 5574, 2009, pp. 651-660, 9th International Conference on Algorithms and Architectures for Parallel Processing, Taipei, TAIWAN, Jun. 8-11, 2009.] While these embodiments will likely have less vibration (due to no camera movement), they may not all provide the ability for sufficient closeness to the subject.

In any of the exemplary embodiments hereof, it may be preferable that the assembly 100 have any range of movement necessary to achieve any absolute positioning (within specified tolerances) of the camera 116 in three-dimensional space as required. It may also be preferable that the assembly 100 have any range of movement necessary to place the camera 116 to any relative positioning (offsets) in three-dimensional space as required for focus stacking and/or stereo photography (including macro stereo photography).

The controller 108 may include any type of controller including but not limited to a computer, a mobile device, a phone, a tablet, a laptop, a server, a cloud platform, or any other type of general or dedicated controller. The controller may include software, applications, scripts, programs or other types of media that may control the movements of the motors, carriages 110-1, 112-1, 114-1, and any other components of the system 100 as necessary. The controller may also control aspects of the camera 116 such that it may trigger the camera to take a picture, to focus or to perform other functionalities necessary during it operation. The controller 108 may interface, be connected to, or otherwise communicate with the system 100 and/or the camera 116 using wiring, cables, networks, wireless communications, Wi-Fi, telephony, the Internet, Bluetooth or any other communication protocols or mechanisms. The controller may provide completely automated control of the system 100, semi-automated control of the system 100 (e.g., may require periodic user input), manual control of the system 100 (e.g., the user interfaces with the controller 108 to control the system 100), or any combination thereof.

In one exemplary embodiment hereof, the controller may be a mobile device such as a smart phone, the software may be a mobile application residing on the mobile device, and the mobile device may communicate with the system 100 via Bluetooth or the like.

Figure 2:
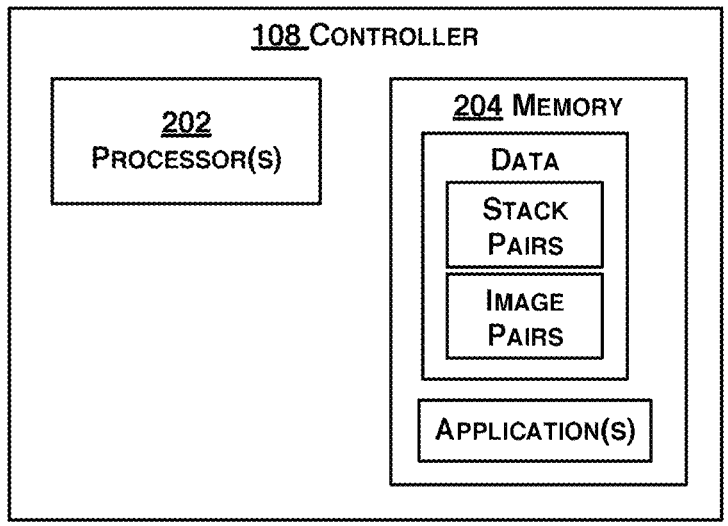

FIG. 2 shows aspects of a controller, including one or more processors 202 and a memory 204. The memory may store data including stack and image pairs (discussed below), and one or more applications that may carry out some or all of the processing required.

The System in Operation

The system 100 may be employed to perform and facilitate a number of different photography techniques, including but not limited to, focus stacking, stereo macro photography and time-lapse photography.

Figure 3A:
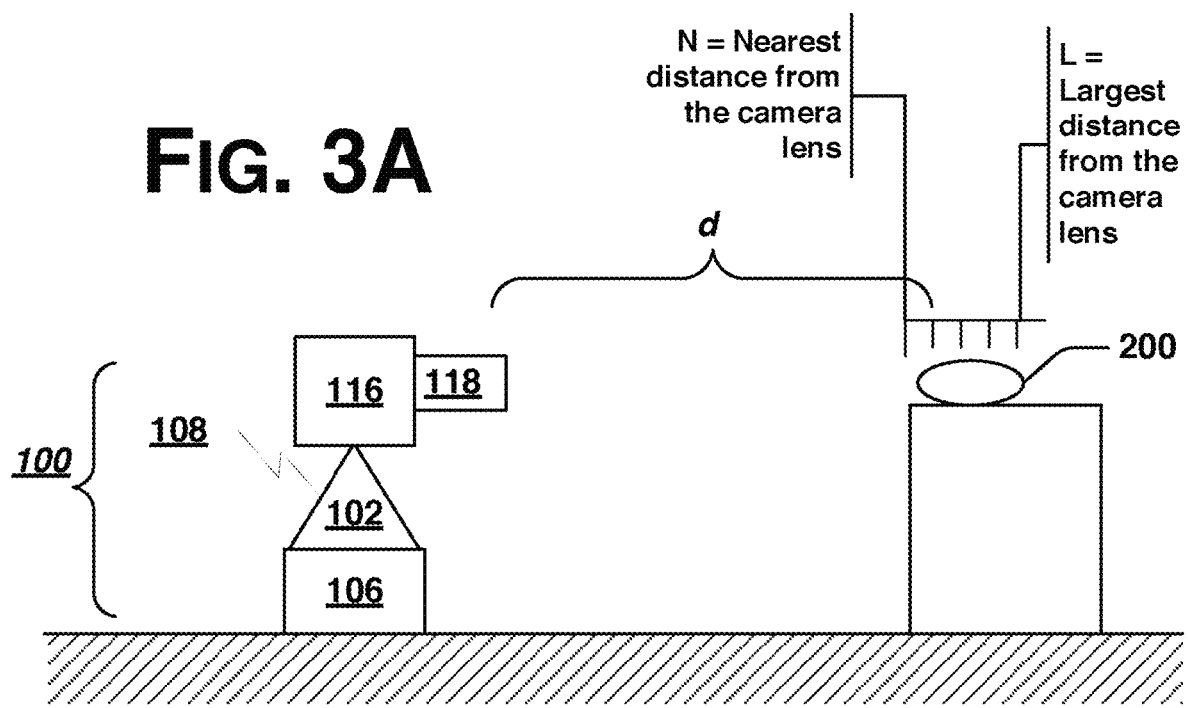
Figure 3B:
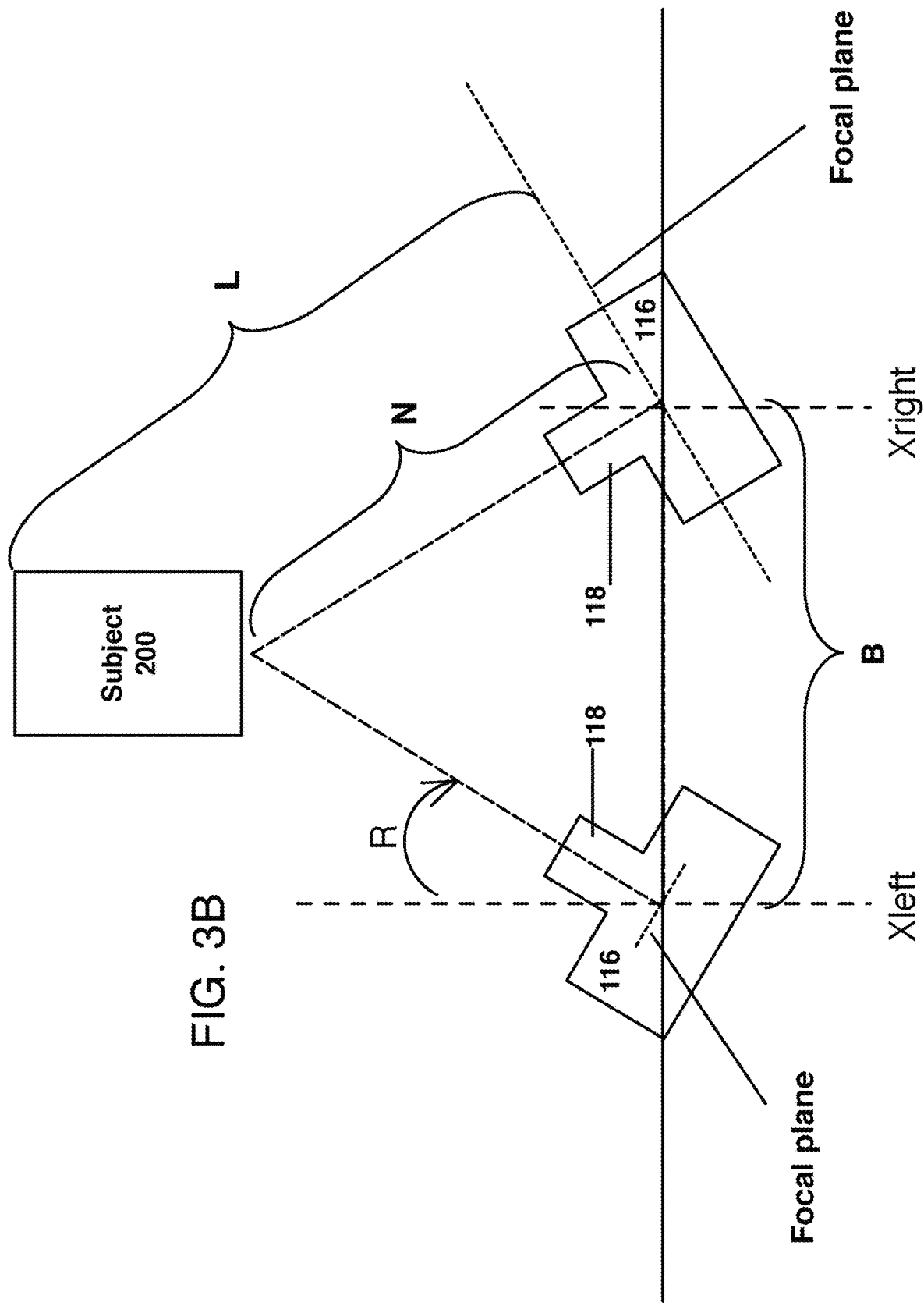

With reference to FIGS. 3A-3B, a camera 116 with a lens 118, and mounted on a positioning assembly 102, supported by support structure 106, may be positioned at an appropriate distance (d) from a subject 200. For macro photography, the distance d may be sufficiently small to focus on at least a part of the subject 200.

When initially positioned, the camera is at a particular position (x1, y1, z1) with respect to the subject 200. For the sake of this description, x1 is considered the first X position.

Figure 4:
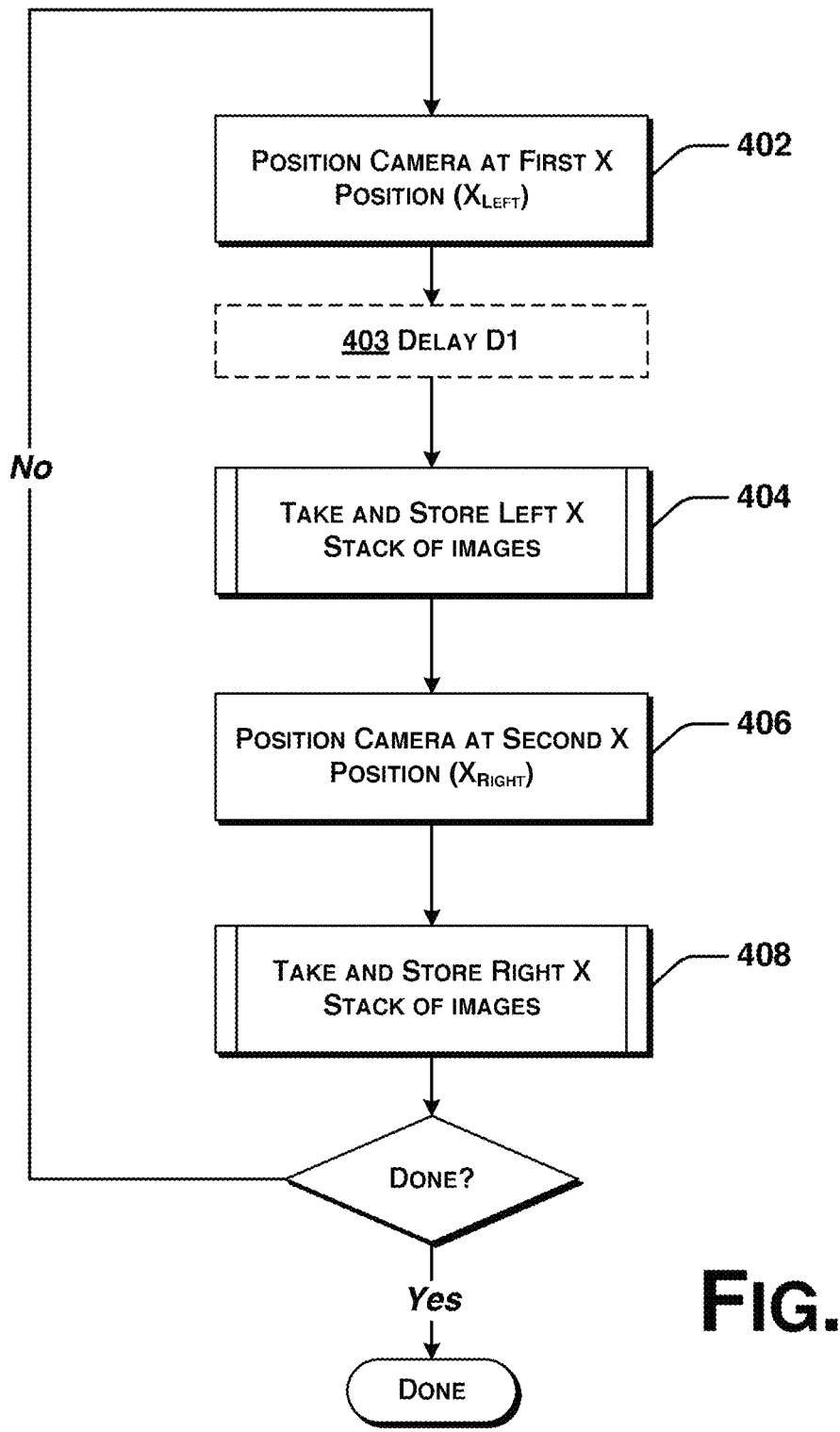
FIG. 4 is a flowchart showing aspects of operation of a time-lapse stereo macro photography system according to exemplary embodiments hereof.

With reference to the flowchart in FIG. 4, the camera is positioned (at 402) at the first X position (x1 or $X_{left}$). Then, a stack of images (the left stack) is obtained and stored (at 404). The image stack may be obtained by obtaining a series of images of the subject 200 at various distances from the subject, while keeping the focus of the lens 108 fixed. A stack preferably includes at least three images, but may include fewer or many more. Typically a stack has from 12-30 images, however, it could go up to 100 or more. A person of skill in the art, using the system, would know how to pick the stack size (number of stack images). The number of images in a stack may be a function, e.g., of the type of subject.

The camera is then positioned at second X position (x2 or)($x_{right}$) (at 406), and a second stack of images (the right stack) is obtained and stored (at 408). The second or right stack may be obtained in the same way as the left stack. Preferably the left and right stacks comprise the same number of images, taken at the same distances from the subject 200. However, the stacks may have different numbers of images and may be taken at different distances from the subject.

As noted above, the camera may be rotated (e.g., by automatically rotating the carriage 110-1 or a mount mechanism (not shown)). In this manner, the camera may be angled differently for the left and right images. This rotation may be referred to as a "toe-in." In embodiments in which a rotation is applied, the camera is rotated when positioned (e.g., at 402 at 406). When a toe-in rotation is used, the angle of rotation may be determined based on the length of the stereo base (B), discussed below, and the distance(s) to the subject. The rotation angles may be calculated by the controller based on information provided to the controller, either by a user or automatically (e.g., obtained from the camera). FIG. 3B shows an example rotation R for the camera in the left position ($X_{left}$). The rotation for the right position will be -R. Although shown in the drawing as being based on the distance N, the value of R may be determined based on N, L, or a combination thereof (e.g., based on L-N).

The second position may be determined as a function of the first position and the distance of the camera to the subject. Various ways of determining the distance between the first and second positions (sometimes referred to as the stereo base or just base) are discussed below.

The distances and stack sizes may be parameterized.

The two stacks of images obtained (at 404 and at the immediately following 406) are considered a left-right stack pair.

This process is repeated for a period of time and/or until a certain number of pairs of image stacks have been obtained. The period of time and/or the number of stack pairs may be parameterized.

The images obtained (at 404 and 406) may be stored in the controller 108 and/or in the camera or elsewhere. The images may be stored in a stack pair data structure (e.g., as shown in FIG. 5A), where left and right stacked images are paired time ordered. Since the right images (in the flow chart of FIG. 4) are acquired some time after the left images (by virtue of having to move the camera), the images are paired such that each right stack is paired with the most recently acquired left stack (assuming that the left stack is acquired first).

The images may be transferred from the camera to the controller at any time, including during the repositioning of the camera.

Preferably the right-X images (obtained in 408) are taken as soon as possible after the camera is correctly positioned at $X_{right}$, although some delay may be required to deal with movement-induced vibrations.

After the $X_{right}$ images are obtained (at 408) and the camera is repositioned (at 402), there may be a pre-determined delay (at 403) before the next $X_{left}$ image stack is obtained (at 404). This pre-determined delay may be in addition to any delay required to deal with movement-induced vibrations. This pre-determined delay may be parameterized.

The left and right image stack pairs may be processed offline (e.g., by controller 108 or some other computer system using known focus stacking techniques) to produce corresponding left and right image pairs (as shown, e.g., in the image pairs data structure of FIG. 5B). Each stack of images may be processed in a known manner to produce a corresponding image. Thus, in the example of FIGS. 5A and 5B, the left stack LS1 is processed to produce the left image LI1, and so on.

Focus stacking is a post-production technique that may increase the depth of field. The technique involves combining multiple images of the same subject at the same angle (viewpoint) but at different focus distances. The images are combined using software to create a resulting image with a high depth of field. Focus stacking may also be referred to as focal plane merging, z-stacking or focus blending.

The left and right image pairs may then be stored and presented to show a stereo time-lapse video ("film") of the subject. As used herein, the term "video" refers to any kind of video, preferably digital video and comprising one or more sequences of digital video images or image pairs.

As noted, various aspects of this process may be parameterized, allowing a user (a photographer) control over, e.g., the number of stacks obtained, the number of images in each stack, the distances moved in the X direction, and the delay between stack pairs. Particular implementations may allow for variation on these parameters and for changing them over time. For example, a particular time-lapse sequence may use different stack sizes and/or delays at different times during the sequence.

It is noted that steps described in the example above are for conceptual and demonstrational purposes, and that the steps may be performed in any adequate order. In addition, some of the steps described may be removed and other steps may be added as required.

In another embodiment, the support structure 106 may be positioned on a track (e.g., a curved track), so that the camera may be repositioned around the object.

If the camera uses a mirror, the mirror is preferably locked up during image capture to avoid vibration.

Although described with camera rotation, not all embodiments require rotation (i.e., toe-in). As should be appreciated by those of skill in the art, images obtained without toe-in may be processed (e.g., post-processed) by reducing the width of the final image to deal with any area of overlap.

Determining the Stereo Base

As described above, the camera is moved between two positions ($X_{left}$ and $X_{right}$). A person of ordinary skill in the art would know how to determine the preferred separation between the two camera positions (optical axes), e.g., using the Bercovitz formula (described below), possibly with variations.

The distance between $X_{left}$ and $X_{right}$ may be referred to as the stereo base or just base (B). The stereo base (B) is the distance between the camera's optical axes in the two positions ($X_{left}$ and $X_{right}$) (FIG. 3B). Those of ordinary skill in the art will appreciate and understand, upon reading this description, that the value of B may be a function of various factors including one or more of (all measurements in the same units, e.g., mm):

P=Parallax desired, in mm on the image
L=Largest distance from the camera lens
N=Nearest distance from the camera lens
F=Focal length of the lens
Then, using the so-called Bercovitz formula:

$$B=P/(L-N)(LN/F-(L+N)/2)$$

Note that L−N is the front-to-back depth of the subject. For stacked images, L may be the depth of the furthest image and N may be the depth of the nearest image. If the largest distance L is infinity, then $$B=P(N/F-1/2)$$

As should be appreciated, other techniques (e.g., the Boyer formula or the so-called Di Marzio magnification equation [http://nzphoto.tripod.com/stereo/3dtake/fbmarzio.htm]) may be used to determine a suitable value for B.

Note that some less preferred embodiments may use a general rule, also sometimes referred to as the "normal" rule, where the ratio between the stereo base (B) and the distance to the subject is 1:30 (or 1:15, or 1:60). That is, $$B=D/30$$

The stereo base (B) may be determined by the controller 108, as part of a setup procedure, and based on inputs from the user (or inputs obtained automatically by the controller from the camera).

The distance D=L−N may be any number that provides macro images. In some uses, the distance D may be less than 2.54 cm (one inch).

CONCLUSION

As used herein, and unless otherwise specified, the terms "subject" and "subject image" may refer to the object, item, scene, landscape, or other physical form whose image is intended to be captured and reproduced using photography or other means of image reproduction. As should be appreciated, the scope of the various exemplary embodiments of the system as described herein is not limited in any way by the subject, the type of subject or by any characteristics of the subject.

Where a process is described herein, those of ordinary skill in the art will appreciate that the process may operate without any user intervention. In another embodiment, the process includes some human intervention (e.g., a step is performed by or with the assistance of a human).

The term "mechanism," as used herein, refers to any device(s), process(es), service(s), or combination thereof. A mechanism may be implemented in hardware, software, firmware, using a special-purpose device, or any combination thereof. A mechanism may be mechanical or electrical or a combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

Thus are described methods, systems, and devices to make a stereo time-lapse video of a subject.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed is:

1. A method of producing a sequence of time-lapse stereographic images of a subject, the method comprising:
   (A) positioning a camera with a macro lens at a first position relative to the subject;
   (B) using the camera to obtain a first stack of images of the subject from the first position;
   (C) positioning the camera at a second position relative to the subject;
   (D) using the camera to obtain a second stack of images of the subject from the second position;
   (E) storing the first stack of images and the second stack of images as a stack pair; and
   (F) selectively repeating acts (A)-(E),
   wherein said using the camera in (B) occurs a first preset time after said positioning in (A), and
   wherein said first preset time is selected to avoid vibration based on said positioning in (A).

2. The method of claim 1, wherein said using the camera in (D) occurs a second preset time after said positioning in (C).

3. A method of producing a sequence of time-lapse stereographic images of a subject, the method comprising:
   (A) positioning a camera with a macro lens at a first position relative to the subject;
   (B) using the camera to obtain a first stack of images of the subject from the first position;
   (C) positioning the camera at a second position relative to the subject;
   (D) using the camera to obtain a second stack of images of the subject from the second position;
   (E) storing the first stack of images and the second stack of images as a stack pair; and
   (F) selectively repeating acts (A)-(E),
   wherein said using the camera in (D) occurs a second preset time after said positioning in (C), and
   wherein said second preset time is selected to avoid vibration based on said positioning in (C).

4. The method of claim 1, wherein the camera moves along a line, the method further comprising:
   (A1) rotating the camera by a particular angle (R) with respect to the line prior to using the camera in (B).

5. The method of claim 4, further comprising:
   (C1) rotating the camera by a negative of the particular angle with respect to the line prior to using the camera in (D).

6. The method of claim 1, wherein a distance between said first position and said second position, referred to as a stereo base, is based on one or more of: a parallax desired; and/or a largest distance of the subject from the camera lens, and/or the nearest distance of the subject from the camera lens, and/or a focal length of the lens.

7. The method of claim 1, wherein the acts (A)-(F) are, at least in part, controlled by a controller, and
   wherein a distance between said first position and said second position, referred to as a stereo base, is determined automatically by said controller based on information obtained from said camera and/or information provided by a user.

8. A method of producing a sequence of time-lapse stereographic images of a subject, the method comprising:
   (A) positioning a camera with a macro lens at a first position relative to the subject;
   (B) using the camera to obtain a first stack of images of the subject from the first position;
   (C) positioning the camera at a second position relative to the subject;
   (D) using the camera to obtain a second stack of images of the subject from the second position;
   (E) storing the first stack of images and the second stack of images as a stack pair; and
   (F) selectively repeating acts (A)-(E),
   wherein the camera moves along a line, the method further comprising:
   (A1) rotating the camera by a particular angle (R) with respect to the line prior to using the camera in (B), wherein said particular angle R is determined automatically, based on one or both of:
   a distance between the first position and the second position; and/or
   a distance of the camera from a part of the subject.

9. A stereo time-lapse video comprising multiple image pairs obtained by the method of claim 1.

10. The stereo time-lapse video of claim 9, wherein the video comprises a digital video.

11. The method of claim 1, wherein said selectively repeating in (F) is based on a period of total elapsed time and/or a number of stack pairs obtained.

12. The method of claim 1, wherein a focus of the macro lens is the same at the first position and the second position.

13. The method of claim 1, wherein the camera is located in a three-dimensional space relative to the subject, and wherein said positioning in (A) and (C) changes the camera's position for only one of the dimensions.

14. The method of claim 1, wherein each repetition of acts (A)-(E) forms a corresponding stack pair, the method further comprising:
   forming a series of image pairs from the stack pairs.

15. The method of claim 1, further comprising:
   (A2) waiting a predetermined amount of time after position the camera in (A) and before using the camera in (B).

16. The method of claim 1, wherein the acts (A)-(F) are, at least in part, controlled by a controller.

17. The method of claim 16, wherein a distance between said first position and said second position, referred to as a stereo base, is determined automatically by said controller based on information obtained from said camera and/or information provided by a user.

18. The method of claim 1, wherein one or more of the following are parameterized:
   (i) the first position; and/or
   (ii) the second position; and/or
   (iii) a number of images in the first stack; and/or
   (iv) a number of images in the second stack; and/or
   (v) a number of times acts (A)-(E) are repeated; and/or
   (vi) a time period during which acts (A)-(F) are repeated; and/or
   (vii) a number of stack pairs obtained; and/or
   (viii) a total elapsed time.

19. The method of claim 2, wherein said second preset time is selected to avoid vibration based on said positioning in (C).

\* \* \* \* \*